United States Patent
Shmunk (10) Patent No.: US 11,372,243 B2
(45) Date of Patent: Jun. 28, 2022

(54) OPTICAL HYBRID REALITY SYSTEM HAVING DIGITAL CORRECTION OF ABERRATIONS

(71) Applicant: ALMALENCE INC, Austin, TX (US)

(72) Inventor: Dmitriy Valer'evich Shmunk, R.P. Koltsovo (RU)

(73) Assignee: ALMALENCE, INC., Austin, TX (US)

( * ) Notice: Subject to any disclaimer, the term of this patent is extended or adjusted under 35 U.S.C. 154(b) by 0 days.

(21) Appl. No.: 16/981,022

(22) PCT Filed: Dec. 27, 2018

(86) PCT No.: PCT/IB2018/060631
§ 371 (c)(1),
(2) Date: Sep. 15, 2020

(87) PCT Pub. No.: WO2019/207350
PCT Pub. Date: Oct. 31, 2019

(65) Prior Publication Data
US 2021/0018751 A1 Jan. 21, 2021

(30) Foreign Application Priority Data
Apr. 28, 2018 (RU) .......................... RU2018116223

(51) Int. Cl.
*G02B 27/01* (2006.01)

(52) U.S. Cl.
CPC ....... *G02B 27/017* (2013.01); *G02B 27/0179* (2013.01); *G02B 27/0189* (2013.01); *G02B 2027/0178* (2013.01); *G02B 2027/0198* (2013.01)

(58) Field of Classification Search
CPC .............. G02B 27/017; G02B 27/0179; G02B 27/0189; G02B 2027/0178; G02B 2027/0198
See application file for complete search history.

(56) References Cited

U.S. PATENT DOCUMENTS

| 5,576,548 | A  | * | 11/1996 | Clarke | ................. | A61B 6/4258 |
|---|---|---|---|---|---|---|
|  |  |  |  |  |  | 250/369 |
| 6,272,392 | B1 |  | 8/2001 | Capodieci |  |  |
| 6,862,373 | B2 |  | 3/2005 | Enomoto |  |  |
| 2002/0062793 | A1 | * | 5/2002 | Lee | ..................... | A22C 21/0007 |
|  |  |  |  |  |  | 119/845 |
| 2013/0293761 | A1 | * | 11/2013 | Guenter | ................. | G03B 13/36 |
|  |  |  |  |  |  | 348/345 |
| 2014/0327604 | A1 |  | 11/2014 | Oyama et al. |  |  |
| 2017/0293146 | A1 | * | 10/2017 | Nicholls | ............ | G02B 27/0093 |
| 2018/0084232 | A1 |  | 3/2018 | Belenkii et al. |  |  |
| 2019/0011709 | A1 | * | 1/2019 | Yadav | .................... | A61B 90/37 |

FOREIGN PATENT DOCUMENTS

| WO | WO2012018282 A1 | 2/2012 |
|---|---|---|
| WO | WO2017/108211 A1 | 6/2017 |

* cited by examiner

*Primary Examiner* — Alexander Eisen
*Assistant Examiner* — Cory A Almeida
(74) *Attorney, Agent, or Firm* — Muncy, Geissler, Olds & Lowe, P.C.

(57) ABSTRACT

A virtual/augmented reality head-mounted display system and method with means to correct optical aberrations is disclosed. The system includes the initial profiling of the head-mounted display system and eye-tracking means.

20 Claims, 9 Drawing Sheets a.

OPTICAL HYBRID REALITY SYSTEM HAVING DIGITAL CORRECTION OF ABERRATIONS

CROSS REFERENCE TO RELATED APPLICATIONS

This application claims priority of PCT Application No. PCT/IB2018/060631 filed Dec. 27, 2018; and Application No. RU2018116223 filed in Russia on Apr. 28, 2018 under 35 U.S.C. § 119; the entire contents of all of which are hereby incorporated by reference.

The present invention relates broadly to the field of optical systems, specifically, to the optical imaging devices used for virtual reality (VR) and/or augmented reality (AR) systems.

More precisely, the invention enables correcting aberrations of the VR/AR optical system by a digital component (i.e. computational software). The invention extends the limitations of optical design and/or range of applicability of VR/AR optical system by improving its quality without introducing additional optical elements or design modifications.

BACKGROUND OF THE INVENTION

Virtual reality (VR) is defined as an artificially simulated 3-dimensional (3D) environment which allows the user to immerse himself/herself in it. The two key assets of VR are immersivity and interactivity. Immersivity occurs when all the five senses are engaged in VR, while Interactivity is achieved when the user can interact with his/her environment through body movements.

Accordingly, a sensory feedback and virtual world are two necessary components for creating a virtual environment. Virtual world includes virtual objects and their relationships inside the environment that makes the resulting virtual environment meaningful. A sensory feedback is reflecting of a user's sensory state at a certain time intervals.

While VR replaces the real-world environment with a simulated one, the Augmented reality (AR) alters one's current perception (real-time) of a real-world, providing a live view of a real-world environment whose elements are "augmented" (or subtracted) by computer-generated perceptual information, ideally across multiple sensory modalities (e.g. visual, auditory, haptic, somatosensory, and olfactory) being spatially registered with the physical world to enable immersivity. The 'mixed reality' is defined herein as a term incorporating VR and/or AR imaging technology.

Head-mounted (or helmet-mounted) displays (HMD) are the most recognizable devices associated with VR/AR (sometimes referred as 'VR glasses'). From rehabilitation to data visualization, HMD-based mixed reality technology has been found to have many applications, such as gaming, military, aviation, medicine and engineering contexts.

Typically, HMD is based on a display device worn on the head (or as a part of a helmet), that has a small display in front of one or both eyes. In a broader sense, the HMDs can be defined as a device attached to user's head, presenting visual information directly to the eyes, including user's peripheral vision.

HMDs differ in its operational technology and visual information, specifically, in displaying only Computer-Generated imagery (CGI), live imagery from the physical world, or combination of both.

HMDs are also classified by its ocular types: monocular (single eye viewing) and binocular (for both eyes), optionally providing a slightly different image perspective to each eye for stereovision.

The HMDs can further be categorized as: video see-through, optical see-through and projection based. In the see-through approach, the virtual environment is replaced by a video feed (of reality) with AR being integrated into the digitized images. In the optical see-through approach, the AR information is directly added (superimposed) into the real-world by using a see-through optical combiner (e.g. a semi-transparent mirror, prism or a holographic optical element). In the projection HMD, the AR image is projected onto real objects and back-reflected into the eye of the user.

The retinal projection (also known as a retinal scan display [RSD] or retinal projector [RP]) technology is also applicable for HMD. It uses a projection (rastering) of the image directly onto the retina of the user's eye. The users see what appears to be a conventional display floating in space in front of them. The retinal projection technology eliminates the need for external screens and complex optical elements. The current generation of Retinal Projection VR headsets utilize special lenses to adjust the visual distance of small screens placed near the eyes.

When designing an HMD, the challenge is to obtain both high imaging quality and compactness. Such specifications are challenging since the geometrical constraints (fitting the user's head), give rise to significant geometrical aberrations.

Most of VR/AR systems utilize some form of (positional) tracking, which is often performed with sensors and cameras external to the HMD. These peripherals can track the position of the user's head, body and hands anywhere within the range of the devices.

A specific HMD configuration includes some eye-tracking means to measure the user's point of gaze and allowing a computer to sense the users line of sight (where the user is looking). This information is important for a variety VR/AR applications where user-interface navigation is used. By sensing the user's (line of) gaze, a system can change the information (displayed by HMD), through bringing specific (e.g. added) details to user's attention.

Eye-tracking real-time measurements (and its extrapolation) are used to modify the HMD's visual data. For example, HMD can potentially change the depth of the displayed field to better simulate natural vision (i.e. better immersivity). The VR objects can also react to user's gaze, or enable the user to select VR/AR items in the virtual world. Using eye tracking technology in HMD proved to be crucial for a truly realistic VR/AR experience, allowing user interface interaction in a much more natural and easy way.

Over the past decades, imaging optics has become increasingly complex to support high-quality optical components and systems (e.g. single-lens reflex [SLR] cameras). The high complexity of optical elements is typically required for effective usage of the available aperture ratio and, importantly, for compensation for undesirable artifacts that inherent to a simple lens element.

Generally, any optical system can also suffer from the optical artifacts, such artifacts as geometric distortions, chromatic aberration (wavelength-dependent focal plane), spherical aberration (optical axis distance dependent focal length), and coma (angular dependence on focus). A minimizing of such artifacts (i.e. non-linear deviations from the ideal "thin lens" model) is an important part of the optimization of the overall imaging system efficiency.

Since each single optical element suffers from such artifacts, the combinations of different lens elements have often been typically used, especially when a high-quality imaging is required (e.g. in photography). Having much better geometric imaging properties, the complex aberration-compensated optical systems, however, suffer from a higher manufacturing cost, weight, lens flare, reduced reliability, etc.

Specifically, due to its wearable nature, the typical HMD-VR systems employ relatively thin and lightweight VR/AR lenses to keep the system as less obtrusive to the user as possible. Obviously, using small, lightweight (and relatively inexpensive for mass-production) optical elements leads to a reduced quality of the optical system, in comparison, for example, to high-quality lenses, often consisting of dozens individual optical elements. Such image quality compromises result from the fact that thinner/smaller (often made of plastic and/or Fresnel lens components) lenses used in HMD displays are prone to aberrations, which, ultimately, spoil the user's VR experience.

While modern VR HMD makers move to higher resolution displays, the image quality has already closed to limits of optical system's capability. Alternative approaches include cumbersome multiple-component configurations intended to improve the image resolution, as described, for example, in U.S. Pat. No. 6,529,331 by Massof, where an array of displays (e.g. 13 per each eye, and corresponding optical elements) are suggested for a high-resolution HMD-VR experience.

The patent WO2017/108211 by Anton, describes a HMD embodiments where the eyepiece and the image plane are relatively tilted by a certain angle (preferably between 1° and 5°) to average through the field of view the on-axis and the off-axis optical aberrations (astigmatism, etc.). Moreover, in this invention, the non-Fresnel optical surfaces of the optical components can constitute a specific diffractive surface to reduce the chromatic aberration.

Apparently, conventional optical designs are unable to address the mutually contradictive requirements for modern VR/AR systems, such as combination of low weight/small footprint/low cost with higher resolution and lower optical aberrations optics.

Apart of the physical HMD modifications (limited by HMD wearable nature), the detailed knowledge of the HMD Optical System (used to produce the Input Image) could also play an important role in correcting of the undesirable artifacts. This knowledge (lens-profile-based) can be used for computational (i.e. digital) aberration correction.

The lens-profile-based image correction methods typically utilize the known characteristics of optical lens/system for (automatic) correction of various types of lens distortion (e.g. color fringes at high contrast edges, vignetting, etc.). For example, the method reported in U.S. Pat. No. 6,862,373 by Enomoto, describes acquisition of both the input data from an image taken by an optical element (lens) and the information about the very lens been used to record this image. The method further describes image processing using information about the focal length and an aperture (i.e. lens iris opening) at the time of recording, as well as lens characteristics to correct aberrations and vignetting in the image.

For example, Beuret, et. al., described the experimental aberration compensation applied to see-through HMD using Spatial Light Modulator (SLM) diffractive element to dynamically compensate for the HMD aberrations. Such system, however, could be found impractical due to the nature of the required components, such as SLM, holographic combiner, and intensive real-time image processing.

To the best of our knowledge, the digital aberration correction has not been effectively applied to the HMD-based mixed reality systems yet (apart of the standard distortion correction and radially-symmetric part of lateral chromatic aberrations).

This disclosure proposes a real-time image processing of the Input Image obtained from the mixed data (i.e. emulated and/or captured VR/AR scene) by applying a digital algorithm containing a beforehand information about this HMD optical System, such as its pre-calculated profile and s position of the user's eye(s).

The disclosed technology also utilizes an eye-tracking system to measure the user's eye pupil position (e.g. calculating user's eye-gaze). The general eye-tracking principles are well-known and described elsewhere, see, for example U.S. Pat. No. 8,120,577 by Bouvin, where the camera, which registers the eyes' movements, can be positioned in an eyeglass frame worn by the user.

In the preferred embodiment of the invention, the 'digital lens' is based on a non-blind deconvolution approach for electronic optical aberrations correction, which is specifically optimized for (lightweight) HMD VR systems. The similar method was originally disclosed in the international patent application WO2012018282 by Shmunk, where a similar non-blind deconvolution technique, which is based on knowledge (i.e. profiling) of the existing optical imaging system, is described. In that disclosure WO2012018282, the artificial neural-network (NN) is applied in a similar manner, however, the emphasis was made to improve the optical resolution using multiple input images (versus the aberrations' reduction in a single input image of the current disclosure).

In general, a point-spread function (PSF) is an important property in predicting of a light propagation and imaging system performance. Accordingly, in the preferred embodiment of the invention, the 'digital lens' is based on PSF-extraction for various scales of the image (i.e. emulated and/or captured image details) and subsequent NN training.

This disclosure describes the (HMD-based) VR/AR systems with improved quality, while using (e.g. conventional) low-cost optical components. The proposed design eliminates the need for complex (big, heavy and expensive) optical systems, while providing a better image quality and, ultimately, a better user VR/AR experience.

Specifically, instead of using a complex optics, the VR performance improvement is achieved by adding a pre-process or a post-process computational component to correct aberrations of the HMD optical system. Such component (i.e. computational processing based on the disclosed algorithm) hereinafter referred as a "digital lens" of the optical system. Generally, such digital lens (DL) includes optical profiling of the pre-defined optical system, and a knowledge of the user's pupil position, as will be described in details below.

The disclosed method expands the applicability of the VR/AR HMD-based systems. It can be either applied to existing lens/display designs, or used in new HMD designs that are free of typical hardware constraints. Furthermore, the disclosed invention is applicable to any HMD configurations and technologies (prisms, semi-transparent mirrors, projectors, Fresnel lenses, etc.).

Further features and aspects of the present invention will become apparent from the following description of preferred and optional embodiments regarding the attached drawings.

SUMMARY OF THE INVENTION

This invention describes a head mounted display (HMD) based on an optical system designed to receive a mixed-reality data such as a computer-generated imagery, a real-world imagery (or it's possible combinations) in a form of the input image. The optical system is designed to processes such input image, also inadvertently introducing optical aberrations into it. Furthermore, the invention includes a digital lens (i.e. digital algorithm) applied to correct the aforementioned optical aberrations.

The invention also describes eye-tracking means to track a position of user's eye or user's gaze direction.

The digital lens itself is based on two consequent procedures. While the first procedure includes producing an eye-box data and optical system profile (e.g. neural network [NN] weighting coefficients), the consequent second procedure produces an eye-tracking data and applies the optical system profile to form a corrected image, which is free of the said optical aberrations. The corrected image is then to be displayed to the HMD user.

In addition, the first procedure may include a point-spread function (PSF) extraction, NN training/weighting coefficients extraction, separating the PSF into a near-field and a far-field parts, calculating a far-field kernel and producing a far-field corrected image. The second procedure, in turn, may include NN launch, (reconditioned) output calculation, and summation of the reconditioned NN output value with the Low Frequency (LF) part.

The disclosure can be applied to various HMD configurations, such as half-mirror-based, a prism-based, a waveguide-based, or retinal scanning-based systems, optionally designed for a left eye and a right eye of a user.

The eye tracking data includes three-dimensional coordinates of a pupil/eye-ball, or a gaze direction. In addition, foveated imaging can be performed in connection to the eye tracking data.

Furthermore, the disclosure describes an optical imaging method for removing optical aberrations, based on the described HMD system. Such method may involve Levenberg-Marquardt algorithm for NN training.

BRIEF DESCRIPTION OF THE DRAWINGS

FIG. 1 a., b.: Prior Art. Examples of the HMD systems.

DETAILED DESCRIPTION OF THE PREFERRED EMBODIMENT

For this disclosure, the term 'HMD' is defined hereto as a housing adapted to be worn on the head of a user, wherein the housing is adapted to hold an HMD optical system to process a mixed data and present its processed content to a visual field of the user in a form of a displayed image.

For this disclosure, the term 'displayed image' is referred hereto to the image observed by the viewer.

For this disclosure, the term 'mixed data' is defined hereto as an imagery information created by Computer-Generated Imagery (CGI) (i.e. emulated), which is optionally augmented by the real-world information (i.e. AR applications), which, in turn, either captured by a camera, or delivered directly to the user's eye by the HMD optical system.

The input image is a visual information formed by the mentioned mixed data (i.e. CGI only, or CGI with physical world imagery). Specifically, for this disclosure the term 'input image' is defined hereto either as an image that includes CGI, an imagery from the physical world, or any combination of thereof.

The (HMD) optical system is adapted to receive the input image and convert its content into the displayed image. The term 'optical system' is defined hereto as the all the components of the HMD optical system that used to create the displayed image, excluding the DL (i.e. a digital lens with and eye-tracking system, that provides the data to digital lens).

The term 'captured image' is referred hereto as the image captured by the digital camera. The captured image can be a part of the input image (e.g. for AR implementation of HMD) or being excluded from the input image completely (e.g. for VR HMD applications).

The CGI digital content can be created by a computer processing means (e.g. GPU—graphics processing unit), either integrated within the HMD housing or located separately, i.e. being tethered (by a cable or wirelessly) with the said optical system.

The (HMD) optical system can be adapted to be transmissive (see-through) in such a way that the user can view a surrounding environment (real-world) through the optical system. Alternative optical system embodiments can include projection-based and retinal projection-based HMD.

For the preferred embodiment of the invention, the eye-tracking measurements are performed by an eye-tracking system, which can be integrated into a HMD or used separately. The 'eye-tracking system', is defined hereto as a system used to measure (i.e. track in a real-time) the user's eye pupil(s) position and possibly a user gaze direction. Such eye-tracking measurements hereinafter referred as an 'eye-tracking data'.

The eye-tracking data are used to pre-correct the displayed visual information. In the preferred embodiment of the invention, the technology is provided for integrating the eye tracking (either camera-based or camera-less) and display functions by using shared optics of a see-through (either video or optical), near eye, mixed reality display device.

The knowledge of the user's eye-tracking data (e.g. eye pupil position) allows for a 'foveated imaging' technique to be implemented. As commonly known, the 'foveated imaging' is a digital image processing technique in which the image resolution (or amount of detail), varies across the image, depending on a single or multiple 'fixation points'. In connection to the current invention, the fixation point indicates the highest resolution region of the input image and corresponds to the center of the eye's retina, i.e. the fovea.

In the preferred embodiment of invention, the eye-tracking-enabled foveated imaging allows the digital lens algorithm to be applied to the input image selectively. Specifically, the strongest aberration correction (the highest resolution region of the input image) is applied to the user's lane of gaze, i.e. around a fixation point (within the input image) corresponding to user's fovea. Such strongest aberration correction includes correcting for smear due to astigmatism and/or spherical aberrations. The rest of the input image can be processed with a simpler technique, e.g. by correcting lateral chromatic aberrations only, as an example.

Figure 1:
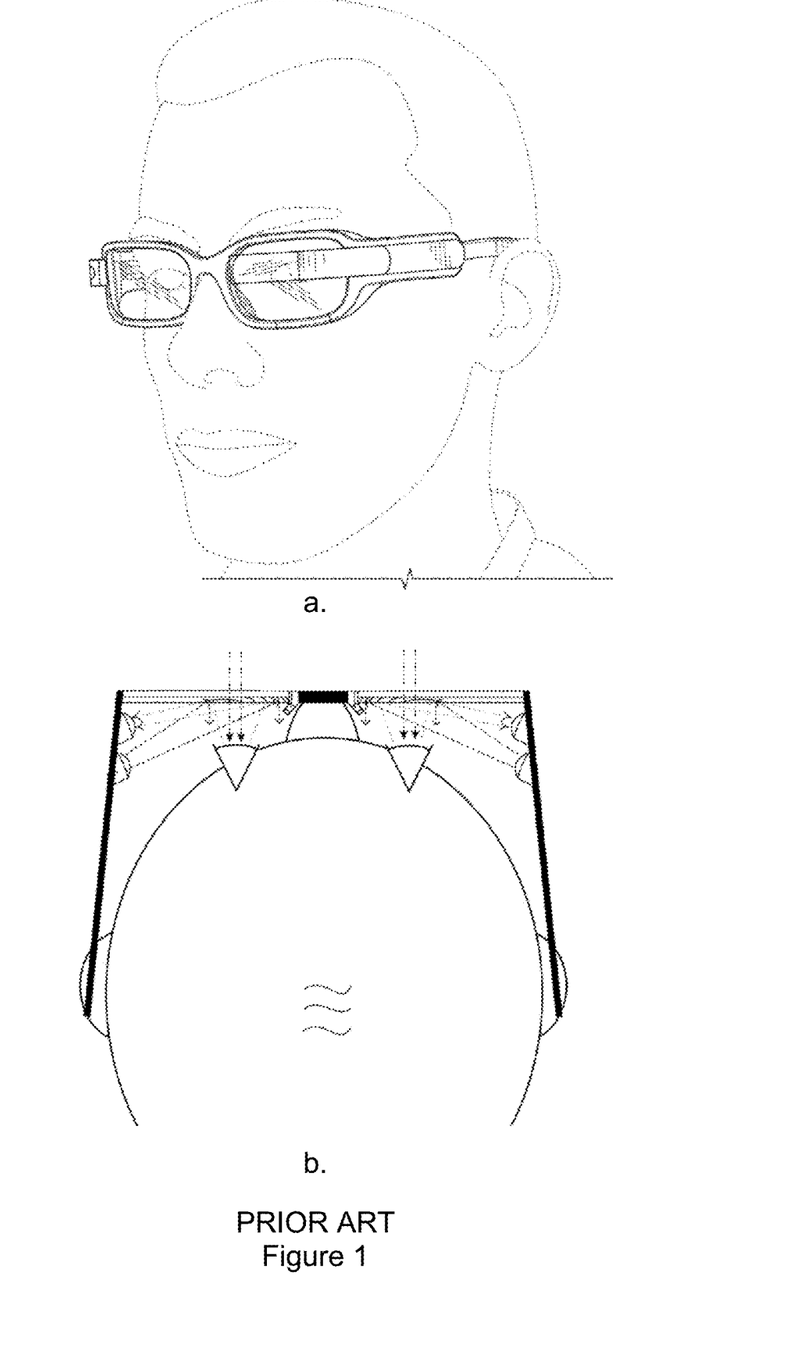

A prior art example of the conventional HMD system is shown in FIG. 1 (*a*). and FIG. 1 (*b*), per the U.S. Pat. No. 9,429,772 by Heinrich, and U.S. Pat. No. 9,658,453 by Kress, respectively. The latter technology (by Kress) describes the optical elements which correct various optical defects arising from either the display unit or the diffractive combiner (often used in HMDs). It is acknowledged by Kress that the reflection of display light by a diffractive optical combiner (flat, planar design) is not ideal, resulting in such optical aberrations (in the reflected display light) as distortion, color blur, spherical aberration, coma, and astigmatism.

While diffractive optical combiner could be curved in some designs, it leads to a higher complexity, also requiring additional fabrication steps. Furthermore, a color blur can be addressed by using a single color or monochromatic display source, but of the remaining optical aberrations, astigmatism is still the dominant aberration that most detracts from image quality. Kress further describes the steps that can be taken (i.e. to correct for optical aberrations introduced by the diffractive optical combiner upon reflection into eyes), which include additional optical elements designed to pre-compensate for at least a portion of the astigmatism that can be induced by diffractive combiner, as well as the other optical aberrations mentioned above. Such optical elements can be inserted, slid, attached by a clip, hinging clasp or clamp, transparent glue, a friction fit, or otherwise.

Figure 2:
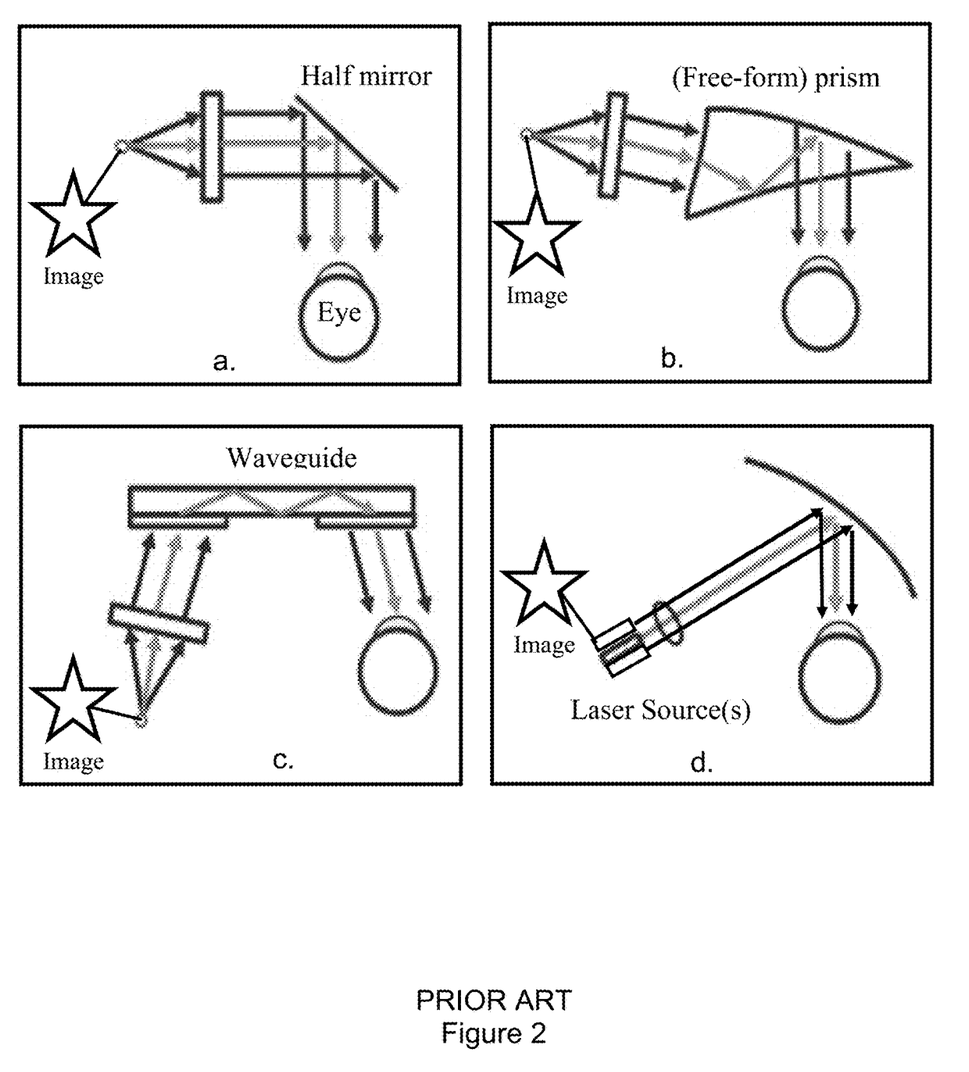
FIG. 2: Prior Art. General overview of the existing applicable HMD systems.

Various designs of the optical see-through head-mounted displays (OST-HMD) are shown in FIG. 2. Specifically, FIG. 2 schematically shows the Half-mirror type (i.e. semitransparent flat mirror or cubic prism) (a.), the Prism-based type (b.), the Waveguide-based type (c.), and the Retinal Scanning type (d.) of an OST-HMD.

Figure 3:
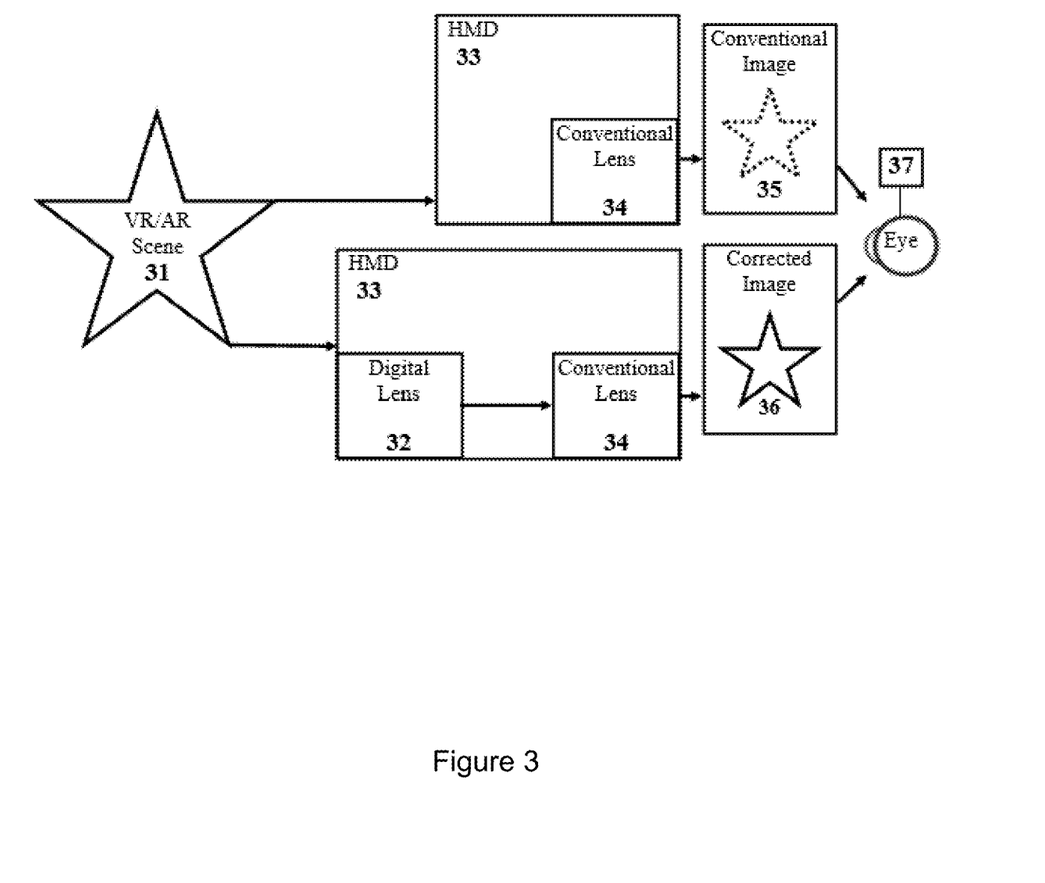
FIG. 3: General view of Digital Lens application to HMD VR/AR system.

As explained further with the reference to the FIG. 3, in order to obtain a corrected image during HMD operation, the image (31) initially passed through the digital lens corrective element (32), and then outputted to the HMD device (33) that has a conventional optical element(s) (34) (e.g. thin plastic lens). The corrected image (36) is then observed by the user's eye (37). This corrected image (36) is free from the aberrations and has a higher resolution compare to a conventionally processed image (35) with no digital lens (32) applied, as schematically shown in FIG. 3. The goal of this disclosure is to use the corrected image (36) for a better, more realistic VR/AR experience in comparison to a conventional image (35).

The current disclosure proposes using a digital lens (hereinafter DL) as a pre-correction step in the display imaging pipeline. Such DL acts as a virtual "corrective lens element", eliminating the need of additional (e.g. heavy and complex) optical elements needed for aberrations correction. To form such DL element, in the preferred embodiment of the invention, the high-quality/high-resolution camera is placed precisely at the location where the observer's eye will be during normal operation of HMD; and the profiling images are captured with this camera. Then, the optical system profile is created, as described in details below.

Furthermore, as mentioned earlier, the HMD includes an eye-pupil location tracking (by the eye-tracking system). Knowing the position of the eye relatively to the rest of the optical system allows an accurate DL correction of aberrations that arise in such system.

As the result of using a DL, the contrast and fine details of the aberrated original image become visible, with color fringes removed. DL can potentially compensate for all aforementioned types of aberrations, including longitudinal chromatic and aberrations causing MTF (modulation transfer function) degradation in the HMD optical elements.

Figure 4:
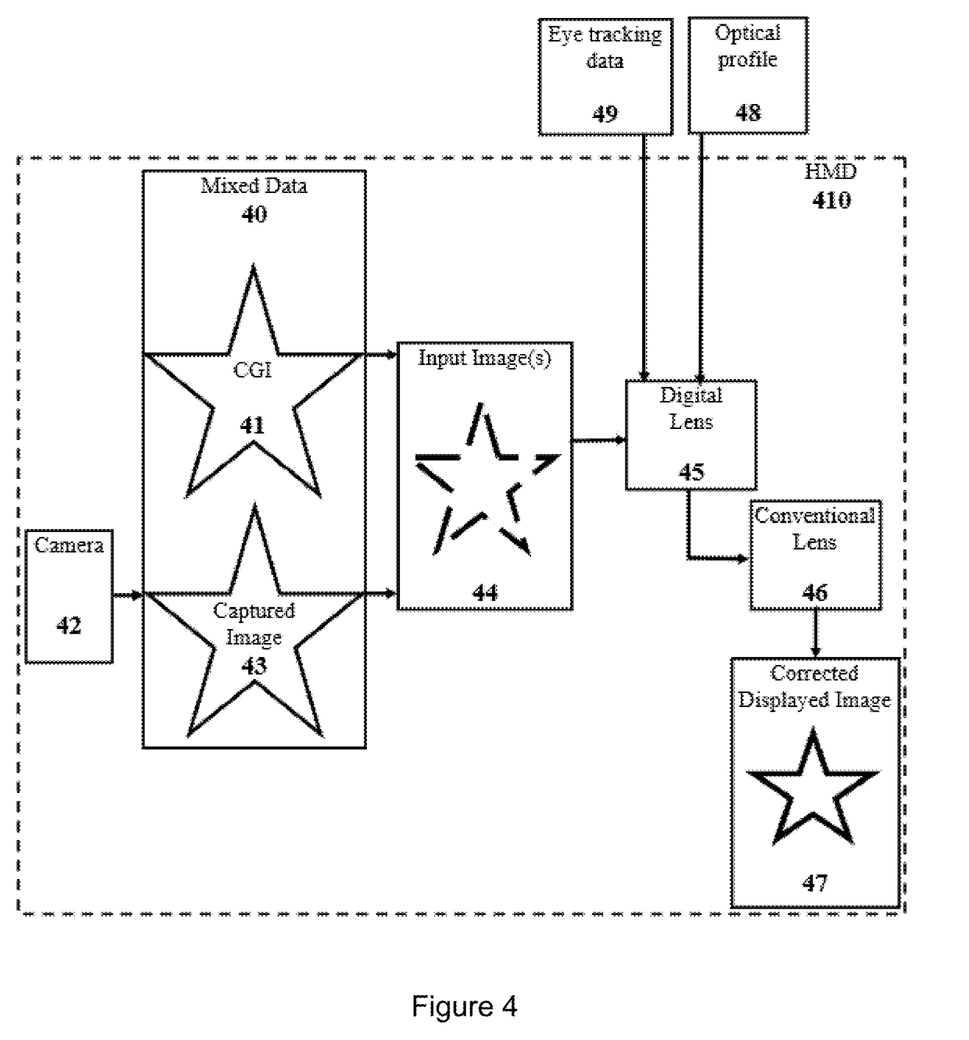
FIG. 4: General view of the optical aberrations correction method.

The application of the DL (as a virtual element of optical system) to HMD-based VR system in a general case of the input image (as defined above), is schematically shown in connection to the FIG. 4, where the HMD (410) constitutes components (40)-(47) of HMD optical system.

Here, the Mixed Data (40) (i.e. (VR/AR scene) is provided either by CGI (41) only (e.g. for VR applications) or as a combination of CGI (41) and a Captured Image (43) (i.e. real-world image) observed by a camera (42).

The resulting product (44) is the Input Image (as defined above), which is, essentially, an input information provided to the HMD (410).

The digital aberration correction is then performed by a computational component (45) (i.e. DL) applied to correct aberrations that are incorporated into the Input Image (44), and in advance of the HMD conventional lens (49) application.

The resulting Displayed Image (47) is obtained after applying a conventional objective/optical lens (46). The resulting Displayed Image (47) is a corrected image in a sense that it represents a significantly improved Input Image (44) without aforementioned aberrations that are intrinsically incorporated into the Input Image (44).

Importantly, the digital algorithm of DL (45) is provided with a specific 'external' data, specifically, the 'optical profile' information (48), and an eye-tracking data (49) (e.g. eye pupil's position).

While the eye-tracking data (47) is provided by an eye-tracking system, the optical profile data (46) is obtained by the profiling of the HMD (410).

Specifically, the optical profile data (46) is created by the profiling the HMD (410) optical system with no DL (45) applied (i.e. in advance of the actual operation of the HMD). This optical profiling of the HMD will be described further in detail (as a Procedure I).

The disclosed invention serves the task of correcting optical aberrations, preferably in HMD-adapted optical systems, and preferably using a non-blind deconvolution technique that is described further in detail. The term 'non-blind' is used herein in a sense that the invention utilizes a point spread function (PSF) which is known (e.g. evaluated in advance) by "profiling" the optical system of concern. In general, the PSF describes the (3-dimensional) response of an imaging system to a point-like object or point light source. In functional terms, PSF is a transfer function of the imaging system in a spatial domain.

Specifically, the disclosed method is based on separating the computational aberrations correction of optical system into two separate procedures, as follows:

The Procedure I,—profiling of an optical system, specifically, obtaining the 'optical profile' containing the information about the optical system (e.g. HMD-based). In this procedure the information of how to optimally correct the aberrations induced by this optical system is obtained. This information is then stored in a form of the 'optical profile' for this particular optical system. Typically, such profiling of the optical system is a time-consuming, iterative process. Fortunately, it only needs to be performed once for the optical system of choice (e.g. when it is designed/manufactured).

Procedure II: Correcting the aberrations of the optical system. Here the DL is applied directly to the data (image) obtained by the optical system. DL includes the information of the optical profile (from the Procedure I) as well as the eye-tracking data (obtained by the eye-tracking system). The resulting, i.e. "corrected" image can further be treated and displayed through the image signal processing and display means (in the same way as it would without the DL correction). This step is non-iterative, relatively fast, enabling to perform the optical aberrations correction of an image, for example, at video signal framerates, either on existing image processors and/or in a power-constrained mobile devices.

These two separate Procedures I and II can be optimized for various imaging applications, including the described VR/AR HMD systems of this disclosure. In the preferred embodiment of the invention, the Procedure I is carried out in HMD optical system of choice, by replacing the position of human eye with a high-quality image-capturing device to effectively profile the chosen optical system. Consequently, any image that would later be produced by this optical system can be corrected routinely in the Procedure II, essentially, canceling the aberrations that are intrinsic to such (e.g. imperfect HMD) optical system.

The Procedure I of the preferred embodiment of the invention includes two major steps, specifically: Step 1: Profiling images capture and geometric/radiometric alignment; Step 2: Creating the optical profile of the optical system. These two steps are as described in details below.

Step 1 (Procedure I): Profiling images capture and geometric/radiometric alignment. In this step, described in in details below in reference to the FIG. 5, a set of computer-generated charts is created. These charts are are displayed on a HMD. Then, these computer-generated charts are recorded by an optical system to be profiled (also shown as (44) in FIG. 4), producing a sequence of, generally N, images (51).

Figure 5:
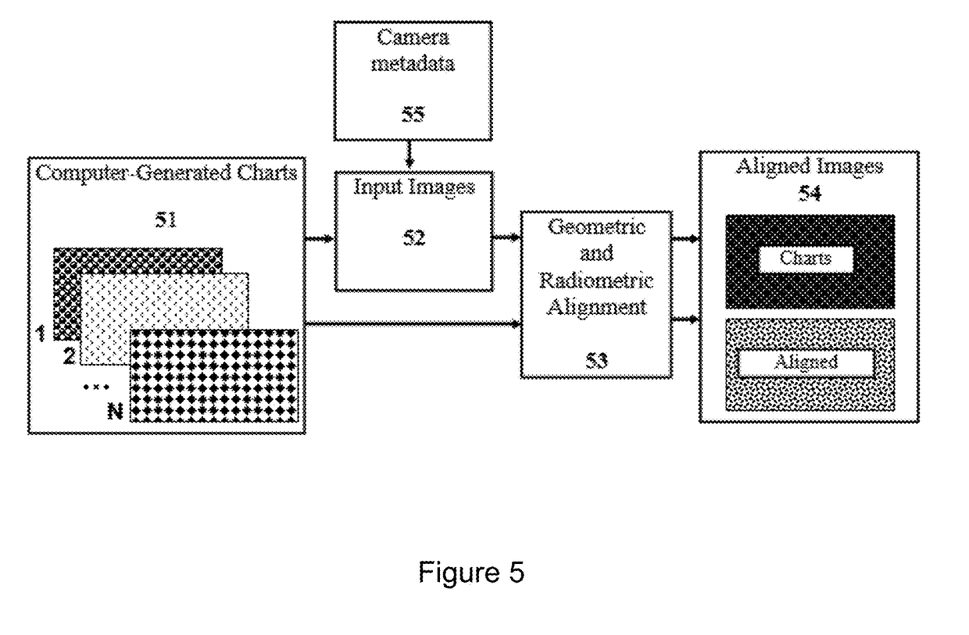
FIG. 5: Geometric and radiometric alignment of charts and images (Procedure 1).

The sequence of images (51) includes the knowledge of the optical system's parameters (i.e. metadata of the camera used during the capture), such as focus distance, aperture size (lens iris value), focal length, etc.

Multiple sequences (i.e. sets) of such computer-generated charts should be recorded with a separate external optical system/camera placed at various different locations, exactly where the observer's eye can be found during a normal HMD operation. Such locations (i.e. volume in space, where eye pupil can be located relatively to the HMD) are referred to as an eye-box. These computer-generated charts represent an eye-box data to be used in the profiling of the optical system.

Such eye-box data provide information on aberration characteristics regarding the observer's eye location, essentially, emulating the eye-tracking data without observer's presence. It can depend on at least one of the following eye-box measurement: an eye ball position; an eye pupil position; or a gaze direction (all registered relative to the optical system of an HMD, i.e. the eye-box).

With the further reference to the FIG. 5, the geometric and radiometric alignments (53) of the charts (51) from the sequence of captured images is performed. For this purpose, a subset of profiling images from the sequence (51) and their captured versions (output of (52)) is used to facilitate the geometric alignment (i.e. scene/features alignment) and radiometric alignment (i.e. estimating the nonlinear function of color values in each image and applying it to align images radiometrically, so that the color values are consistent for all images of a sequence).

Note, that during such alignment procedures, the computer generated charts (51) are aligned with the recorded images, i.e. the versions of the chart images produced by the very system being profiled. All such images are captured with the same camera settings and under the same illumination conditions, so they do not require alignment to each other.

There are various known image processing techniques for geometric and radiometric alignment have been reported in the prior art and can be utilized by the disclosed method, with the goal of providing an accurate (as possible) image alignment in terms of matched colors and geometric features of the charts.

The output of this alignment process (53) is a pair of aligned images (54). In a preferable embodiment if the invention, a subset of image charts, geometrically and radiometrically aligned to their Computer Generated versions, is provided as a part of an output (54) of the alignment process. As shown in the FIG. 5, such pair includes so-called 'Charts' and the corresponding 'Aligned' image.

These images (54) (i.e. charts and their aligned versions together) are further used in creation of the optical system profile, specifically, for extracting knowledge about the way by which the aberrations of the particular optical system will be corrected.

Step 2 (Procedure I): Creating the optical profile of the optical system. The complete process of profile creation (the Procedure I) for an optical system is explained in details with the reference to FIG. 6. The process starts with a pair of input images—charts and aligned (61) (see also (54) in FIG. 5), which are (optionally) divided into tiles (62). This data is passed to a far-field correction (64), which includes the far-field image correction and point spread function (PSF) extraction. The far-field correction (64), in turn, provides two outputs: far-field kernel coefficients stored into optical system profile (63) and pixel data that has only near-field aberrations remaining.

Figure 6:
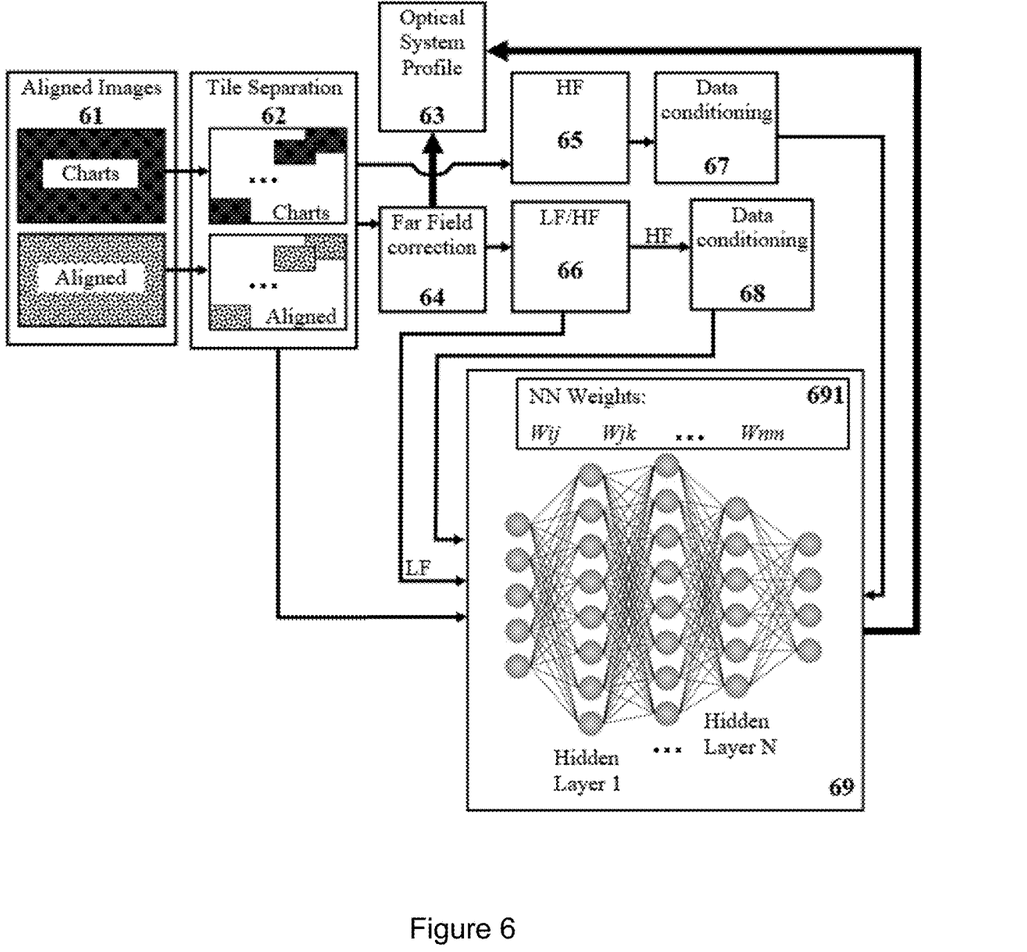
FIG. 6: Optical system profiling (Procedure 1).

These pixel data follows through low-frequency (LF)/high-frequency (HF) separation (66). An outputs of (66) are provided as an inputs for the NN (69) as follows. The pixel data containing LF spatial frequencies (LF part) is passed directly, while the pixel data containing HF spatial frequencies (HF part) undergoes a data conditioning (68) and passed to NN (69). The coordinate of the pixel data (either within the image plane or within the tile), which is provided directly from (62) (or (61) if tiling step is not used) forms another input to NN (69).

The NN (69) further requires a target pixel data to be trained to. Such pixel data is provided from the aligned image through HF filter (65) and data conditioning (67). The NN weights and biases (691) obtained after training are also stored into optical system profile (63).

With the reference to the FIG. 6, the data of Charts and Aligned images (61) (or their aligned tiles (62)) is separated into the two parts according to the data spatial frequencies as follows:

One part (65) will only include the content with the high-spatial-frequencies (hereinafter the HF part extracted from the data), while another part (66) will have both the HF part and an LF part (hereinafter the content with the low-spatial-frequencies, extracted from the data). This separation can be realized by application of any well-known linear filters that based on a low-pass and high-pass kernels, respectively. Importantly, the LF part (66) is not typically affected by aberrations and, therefore, can be passed as-is, without processing. The HF part (65), however, needs to be properly corrected in order to obtain a desirable improved image. As mentioned, the LF part (66) and the HF (65) part are both extracted separately for the Charts and the Aligned images, or respective tiles, if the aforementioned option to divide the images into tiles is used.

With the reference to the FIG. 6, at this step, the previously obtained pixel data from the HF part is prepared (i.e. 'conditioned') by the conditioning procedure (37) to play a role of an input data (reference) for an NN training (69). Typically, the NN (69) is used in machine-learning to estimate (or approximate) functions coefficients (691) that depend on a large number of, generally, unknown, inputs. In image-processing, the NN can use the reference (input) image for self-pretraining procedure, which is well described elsewhere in literature.

Various known data preconditioning techniques can routinely be used before the launch of the NN training. Reconditioning (67) (data manipulation after the NN training) can also be used to improve the NN training efficiency, e.g. to reduce a NN training error. Reconditioning (67) is similar (although not necessarily equal) to inverse of pre-conditioning steps (68). For example, when the dynamic range of NN data is reduced in some way, the output of the NN should be reconditioned with correspondent dynamic range expansion.

In the preferred embodiment of the invention, the preconditioning by (68) and post-conditioning by (67)) include any combination of the following:

A reduction of the dynamic range of the data. Generally, NN operates optimally when it is provided with the data having a limited dynamic range. There are many well-known ways to reduce the dynamic range of the data. One possible way is to normalize the input data by either a sum of input pixels' values or by a maximum input pixel value.

Application of nonlinearity to the pixel's value. Such nonlinearity serves to emphasize the contribution of pixel having small values, hence instructing the NN to produce a more accurate result for small-amplitude inputs. This, in turn, results in a better signal-to-noise ratio (SNR) in the output image. For example, the introduced nonlinearity can have a form of $A^{(1-alpha)}$, where: A—is a pixel value and alpha—is a small constant (typically in the range of 0.02-0.2).

Once trained, the NN algorithm (including data pre- and post-conditioning) will obtain the information (63), (i.e. system profile) about how to convert the aberrated (e.g. blurred) image into the one that is as close to the input image (without aberrations) as possible.

The NN (69) operates in a pixel-wise fashion. Accordingly, in order to correct aberrations for a particular pixel, a certain neighborhood (within the (62)) of this pixel is processed. In the preferred embodiment of the invention, the data is prepared for the NN inputs and outputs, as described in details with reference to FIG. 6.

The NN (69) is provided with the knowledge of the processed pixel's location, effectively allowing the NN (69) adapting to variability of the PSF over the given tile. For this purpose, the input image pixel coordinates are passed to the inputs of NN (63) from the tiling step (62) taken from the image (61).

The HF part (66) from the image tiles (62) is passed to the inputs of NN (69) after being subjected to aforementioned data conditioning (68). This HF part (66) is extracted using pixels within a certain neighborhood (e.g. less than nine pixels distance from the pixel being processed) of the input image.

The HF part (65) of pixels being processed from the tiles (62) is also passed to the outputs of NN (69) after being subjected to aforementioned 'data conditioning' (67) and serves as an NN output data.

Moreover, the LF part (66) from the input image tiles (62) is passed to the inputs of NN (69). As mentioned, this LF part (66) is extracted using pixels within a larger neighborhood (e.g. farther than eight pixels distance from the pixel being processed) of the input image.

Once all the input and the output data is prepared, the NN training is launched.

In the preferred embodiment of the invention, the training is performed using well-known training algorithms, such as Levenberg-Marquardt, for example. Weights of the trained NN (marked (691) in FIG. 6) are extracted and stored in the form of the 'optical system profile' along with the kernel obtained from the far-field correction step (64). The weights and kernel are unique per each tile, so each tile has it's own set of such parameters.

The process of far-field image correction (64) and point spread function (PSF) extraction is described below in detail with the reference to the FIG. 7. Thus, the images (provided by field of view of the camera, (initially shown as (54) in FIG. 5) can be divided into smaller parts, hereinafter called the 'tiles' of the Charts (72) and the Aligned image (71), respectively, using a Tile Separation procedure (70).

The PSF is highly variable by its nature due to its dependence on a size, concentration and distribution of various features within the optical system field of view, importantly, including the position of the user eye. Accordingly, with the reference to the FIG. 7, the optional steps (71) and (72) are generally performed to reduce the variability of PSF shape within the field of view of the given optical system. Within each single tile, the PSF variability (i.e. aberrations) is lower (although still present) and, therefore, can be more effectively compensated, compare to the original (Charts and/or Aligned) images.

Then a so-called remote correction is performed, which is explained below in connection to the FIG. 7. The PSF approximation is extracted (73) and then separated into two parts: the near-field part (74) calculated within a certain neighborhood of a processed pixel (e.g. with radius of less than six pixels); and the far-field part (76), where the PSF (and aberrations) is extracted outside of the near-part radius.

The mentioned extraction of the PSF approximation (73) from the input data can be based on one of the many methods known in prior art, see for example Felix et. al. While this reported method provides a very good PSF estimation, it is very time consuming. For the sake of reducing computational load, a simpler method would be much preferred.

Figure 7:
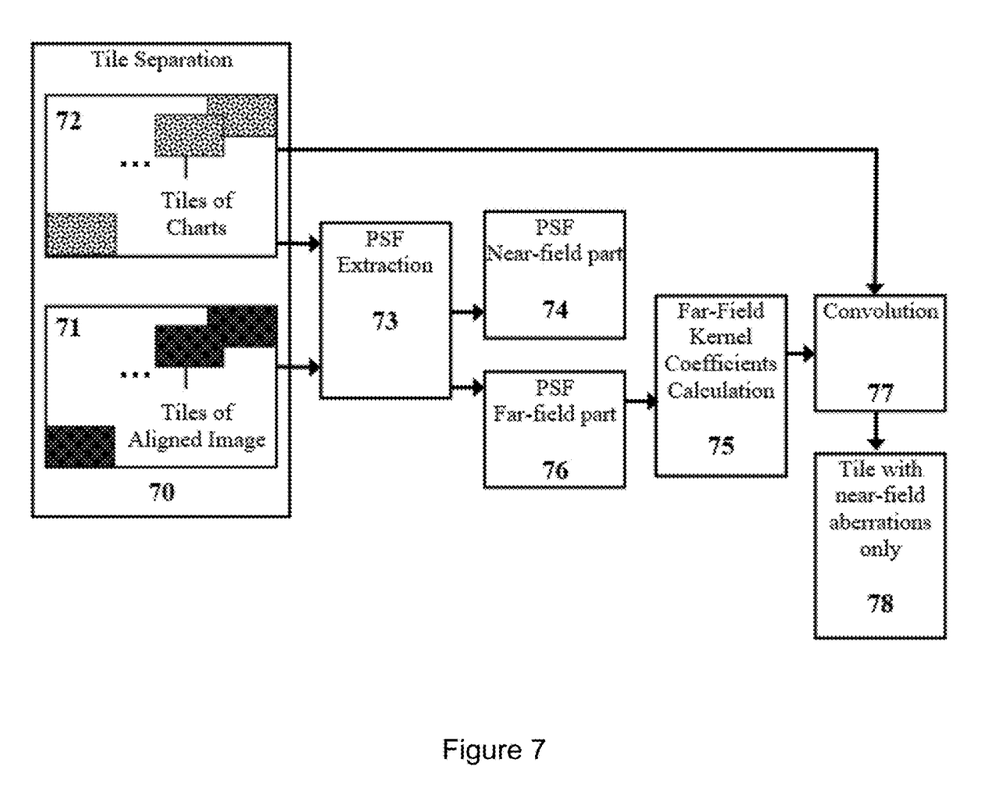
FIG. 7: Far-field image correction and point spread function (PSF) extraction (Procedure 1).

With the reference to the FIG. 7, In the preferred embodiment of the disclosed invention, the following approach is implemented for (73): i) A two-dimensional (2D) Fourier transform of the tile of the Input image is divided by a 2D Fourier transform of the corresponding tile of Aligned image. ii) The result is transformed back with 2D inverse Fourier transform.

Such approach is well-known to one experienced in the art. It worth mention that, in order to avoid over-amplification of the noise components where the Aligned image frequency components are low in amplitude, a guarding bias value(s) should be added to the values of the frequency components of the Aligned image.

Optionally, the far-field image correction with far-field kernel can be used during of DL application. The far-field kernel calculation (75) and convolution (77) result in an image where all the aberrations and blur caused by the far-field part are corrected. The parameters of the chosen far-field correction, namely the kernel coefficients (75) obtained from the far-field correction (76) are recorded to be used later, along with the optical system profile, as described below.

In image processing, a kernel is a convolution matrix, (much smaller than image itself) used for modification of the image (e.g. sharpening, blurring, edge detection, etc.). This is accomplished by applying a matrix convolution operation between a specific kernel and an image of choice.

Near-field part of the PSF (74) is discarded, because a simple reversion is not possible for near-field PSF without significant noise magnification in the output image.

The reason for aforementioned separation (74) and (76) of the processing into the near-field and the far-field is a twofold. First, the far-field correction does not amplify the noise, eliminating undesirable artifacts, and, therefore, can be carried out by relatively simpler methods that require less computational resources. Secondly, such near-field correction requires a limited amount of input data to be processed, hence further reducing the processing requirements. Such separation is performed arithmetically. In a simplest way, all PSF values within certain radius are forming the near-part, while all PSF values outside of this radius are forming the far-part. In practice though, there is some smooth transitional region between these two parts.

The far-field part (76) is obtained by multiplying frequency components by the window which has a zero amplitude at high frequencies while approaches a unit value at low frequencies. A Gaussian 2D distribution would be a convenient example of such window. A 2D inverse transform is employed to obtain the far-field part (76) in a spatial domain. Since far-field corrections do not have high-frequency spatial components, its application does not cause any high-frequency noise components' amplification. Therefore, a far-field kernel construction procedure (75) is straightforward and can be realized by the well-known methods.

The method used in the preferred embodiment utilizes a convolution of the input image with the obtained far-part PSF, following by subtraction of the result from the input image. Such (relatively simple) approach would effectively correct the first-order blur and aberrations caused by the optical system.

It should be noted that so-called secondary aberrations can still be induced due to the fact that the input image (used for processing) is already aberrated, However, since in typical optical systems, the far-field effects are low in amplitude, the secondary effects of such aforementioned correction are negligible.

When the far-field kernel (75) is constructed, its coefficients are passed to the optical system profile. Then, the kernel is convoluted (77) with the input image tile pixel data, resulting in another output of the far-field correction (shown as (64)-(66) connection in the previous FIG. 6). This output is the tile that contains only near-field remaining aberrations (78).

Figure 8:
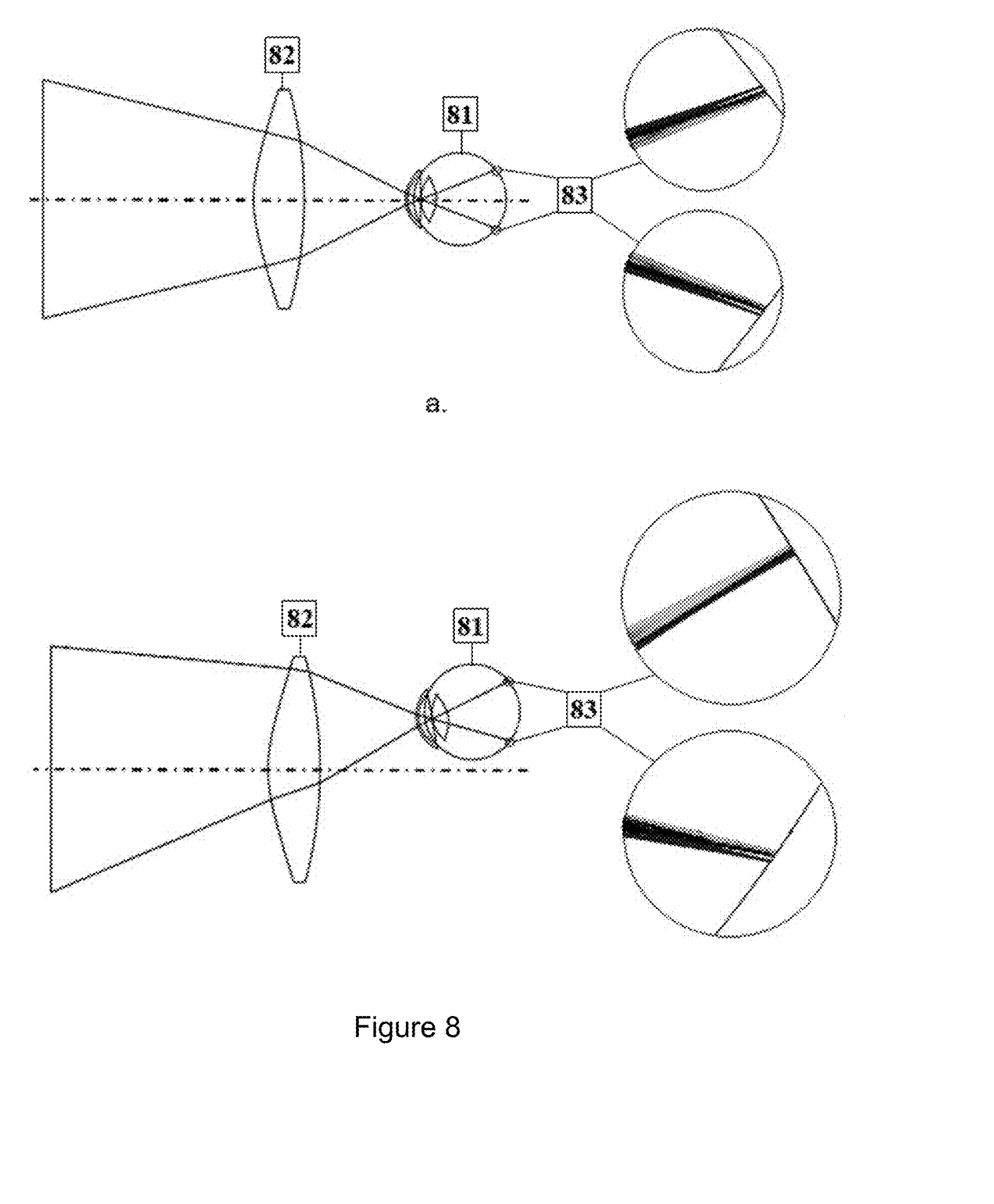
FIG. 8: Chromatic aberration dependence on the position of the eye.

FIG. 8 illustrates the fact that a single conventional (plastic) element (82) (whether usual lens or Fresnel), which is used in HMD, leads to a high dispersion in optical system, and consequently, to a high level of chromatic aberrations. The lateral chromatic aberrations reveal themselves as different color channels hitting retina at different places. FIG. 8 illustrates the dependence of such lateral chromatic aberrations on the user's eye position, specifically, when the user's eye (81) positioned directly at the optical axis (FIG. 8*a*), versus the off-axis eye position within the eye-box (FIG. 8*b*). As shown in magnified inlays (83), the amount of the optical aberration (shown as spreading of the optical rays hitting the retina) is different for these two cases.

To address the aberration dependence on the eye position, the eye-tracking data are used to pre-correct the displayed visual information. The Procedure II of the preferred embodiment of the invention is based on obtaining a real-time eye tracking data, and application of the previously described DL to the input image, as explained here in detail with the reference to FIG. 9.

The eye tracking data is a measurement of the user's eye pupil position by an eye-tracking system. In the preferred embodiment of the invention, the technology is provided for integrating the eye tracking (either camera-based or camera-less) and display functions by using shared optics of a see-through (either video or optical), near eye, mixed reality display device, described, for example in U.S. Pat. No. 8,998,414 by Bohn. With the reference to the FIG. 9, the eye pupil position/gaze data (993) is provided (see also (47) in the FIG. 4) to the NN (990), and, optionally) to far-field correction (95).

The DL application is explained below in detail. Per FIG. 9, the input to the image processing are Input image (92) and optical system profile (96). Original image pixel data is (optionally) separated into tiles (94). It is optionally undergoes far-field correction (95) with kernel coefficients from optical system profile (96).

Figure 9:
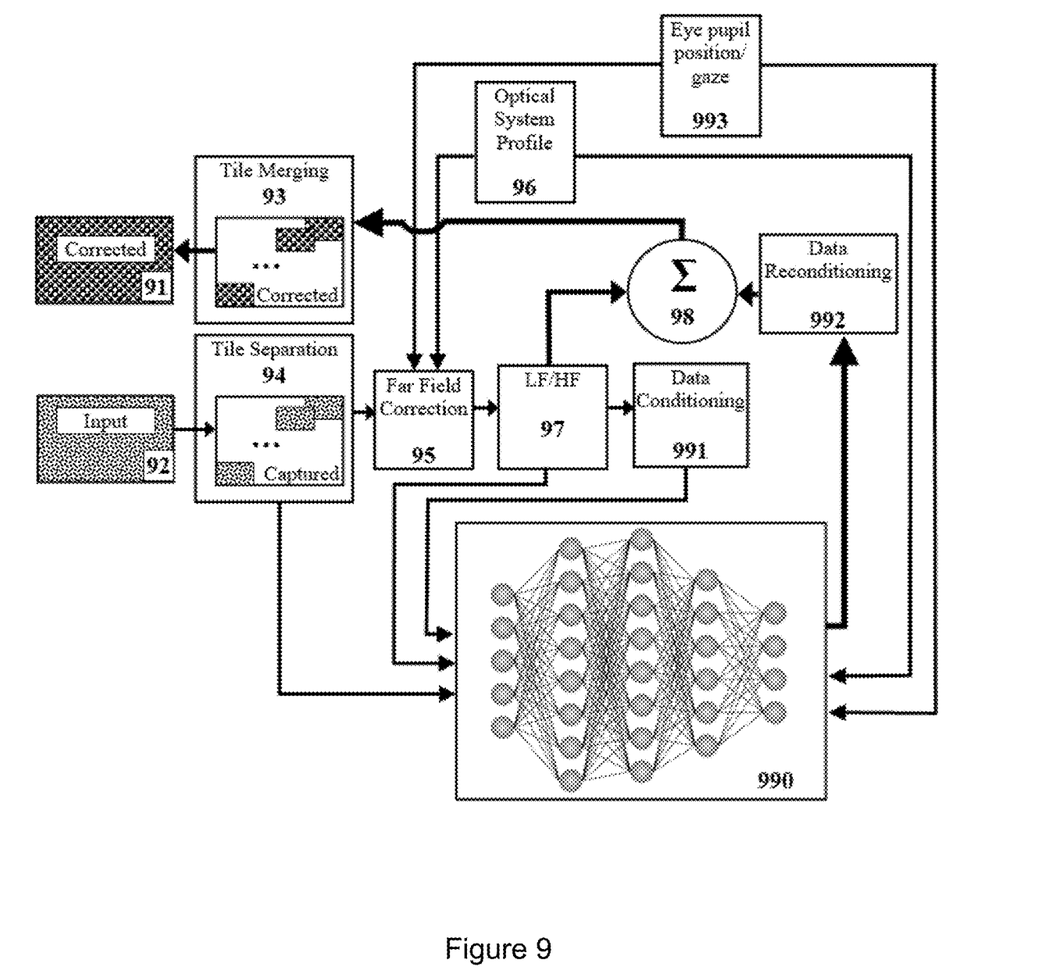
FIG. 9: Full image processing (Procedures 1 and 2).

Afterwards, pixel data goes through LF/HF separation (97) and outputs of this (97) are provided as an inputs for neural network (990), pixel data containing LF spatial frequencies is passed directly, and pixel data containing HF spatial frequencies undergoes data conditioning (991) and passed to NN (990) after that. Yet another input to NN (990) is the coordinate of the pixel data (either within the image plane or within the tile), which is provided directly from (94), or (92) if tiling step is not used. Weights and biases of NN (990) are obtained for a given tile from optical system profile (96).

As mentioned the eye pupil position/gaze data (993) is provided in real-time to the NN (990), and, optionally) to far-field correction (95).

Output of NN (990) undergoes data reconditioning (993) and is summed up (88) with LF output from LF/HF separation filter (97). The summed result is recombined (93) from individual tiles into a single image (if tiling step was used), and such recombination forms the corrected output image (91).

The processing of an arbitrary input scene (while the profile (96) was already been prepared for this system in the Procedure I is performed using processing similar to the Procedure I (optical system profiling), with only a few changes in a data-flow.

The input (92) is the input scene to be processed is passed through tiling procedure (94), in a similar manner to one described in the Procedure I, see FIG. 6 and FIG. 7.

Then far-field correction (95) is optionally performed in a similar manner to one described in the Procedure I (see also (76) in FIG. 7) with the difference that the far-field correction kernel is already known as being taken from the optical system profile (Procedure I).

Then, the image data is separated into LF and HF part (97), similarly to LF/HF separation procedure explained in the Procedure I (see (66) FIG. 6). HF part is further passed through the pixel data conditioning procedure (991), also similarly to the conditioning explained in the Procedure I.

The described procedures (92), (94), and (95), along with the optical system profile (96) (obtained in the Procedure I) form the input data for a NN (990). It is the data that is similar to one been formed during the Procedure I in system profiling step in terms of pixel coordinates with the LF part of pixels being processed, and HF part of pixels within a certain neighborhood.

The following processing of the output of NN (990), ultimately, forms an image (91) (through the tile merging (93)) which is 'perfect' that when displayed through HMD optical system the aberrations are pre-compensated and do not appear in the displayed image seen by the observer. Specifically, the NN (990) output value is passed through the 'data reconditioning' procedure (992), which, in the preferable embodiment of the invention, is an arithmetic inverse of the data conditioning procedure (990). This result is summed by the procedure (98) with the LF part (97) of pixel being processed.

Finally, all processed tiles (93) of the input image are re-combined to form a single output image (91). In the preferred embodiment of the invention, the tiles combined in (93) should have some overlapping areas. In these areas, the result of processing (93) is smoothly attenuated from tile to tile to eliminate any visible seams during the combination into the final image (91). Such visible seams are, caused by a tile-to-tile apparent deviation from the corrected output.

Although several exemplary embodiments have been herein shown and described, those of skill in the art will recognize that many modifications and variations are possible without departing from the spirit and scope of the invention, and it is intended to measure the invention only by the appended claims.

The invention claimed is:

1. A head mounted display (HMD) comprising:
an optical system;
a mixed data, the mixed data being a computer-generated, a real-world imagery or any combination thereof;
an input image, the input image being obtained by the optical system, the input image being formed by said mixed data;
optical aberrations, the optical aberrations being introduced into said input image by said optical system;
an eye-tracking system;
a digital lens having a non-blind deconvolution for correcting the optical aberrations, the digital lens further comprising:
a first procedure and a second procedure to optimally correct the optical aberrations of said optical system, wherein the first procedure is performed in advance of the second procedure, the first procedure comprising:
collecting an eye-box data, the eye-box data comprising a set of HMD-displayed images recorded at multiple locations where observer eye can be found during a normal HMD operation;
creating of an optical system profile, the optical system profile incorporating the eye-box data; and
the second procedure comprising:
forming an eye-tracking data, the eye-tracking data being obtained by the eye-tracking system;
forming a corrected image by applying the optical system profile and the eye-tracking data, the corrected image being the input image with said optical aberrations being corrected; and
forming a displayed image by displaying the corrected image to the user.

2. The system of claim 1, wherein the first procedure further comprising:
extracting a point-spread function (PSF);
launching a neural network (NN) training;
extracting NN weighting coefficients of the NN.

3. The system of claim 2, wherein the optical system profile being a data containing the NN weighting coefficients.

4. The system of claim 1, wherein the second procedure further comprising:
launching a neural network (NN);
calculating a NN output value;
calculating a reconditioned NN output from the NN output value;
performing a summation of the reconditioned NN output value with an original Low Frequency (LF) part.

5. The system of claim 1, wherein the optical system is a half-mirror-based system.

6. The system of claim 1, wherein the optical system is a prism-based system.

7. The system of claim 1, wherein the optical system is a waveguide-based system.

8. The system of claim 1, wherein the optical system is a retinal scanning-based system.

9. The system of claim 1, wherein the displayed image is formed separately for a left eye and a right eye of a user.

10. The system of claim 1, wherein the eye-tracking data being three-dimensional coordinates of a pupil of the eye of the user.

11. The system of claim 1, wherein the eye-tracking data includes foveated imaging.

12. The system of claim 1, wherein the eye-tracking data being a gaze direction of the user.

13. The system of claim 1, wherein the eye tracking data being three-dimensional coordinates of an eye-ball of the user.

14. The system of claim 1, wherein the first procedure further comprising: separating the PSF into two parts, the parts being a near-field part and a far-field part; calculating a far-field kernel from the far-field part; producing a far-field corrected image.

15. An optical imaging method for removing optical aberrations from a head mounted display (HMD), the HMD comprising:
an optical system;
a mixed data, the mixed data being a computer-generated, a real-world imagery or any combination thereof;
an input image, the input image being obtained by the optical system, the input image being formed by said mixed data;
optical aberrations, the optical aberrations being introduced into said input image by said optical system;
an eye-tracking system;
a digital lens having a non-blind deconvolution for correcting the optical aberrations, the digital lens further comprising:
a first procedure and a second procedure to optimally correct the optical aberrations of said optical system, wherein the first procedure is performed in advance of the second procedure, the first procedure comprising:
collecting an eye-box data, the eye-box data comprising a set of HMD-displayed images recorded at multiple locations where observer eye can be found during a normal HMD operation;
creating of an optical system profile, the optical system profile incorporating the eye-box data; and
the second procedure comprising:
forming an eye-tracking data, the eye tracking data being obtained by the eye-tracking system;
forming a corrected image by applying the optical system profile and the eye-tracking data, the corrected image being the input image with said optical aberrations being corrected; and
forming a displayed image by displaying the corrected image to the user.

16. The method of claim 15, wherein the first procedure further comprising:
  extracting a point-spread function (PSF);
  launching a neural network (NN) training;
  extracting NN weighting coefficients of the NN.

17. The method of claim 16, wherein the optical system profile being a data containing the NN weighting coefficients.

18. The method of claim 16, wherein the NN training is performed using a Levenberg-Marquardt training algorithm.

19. The method of claim 15, wherein the second procedure further comprising:
  launching a neural network (NN);
  calculating a NN output value;
  calculating a reconditioned NN output from the NN output value;
  performing a summation of the reconditioned NN output value with an original Low-Frequency (LF) part.

20. The method of claim 15, wherein the displayed image is formed separately for a left eye and a right eye of a user.

* * * * *